(12) United States Patent
Xi (10) Patent No.: US 12,148,399 B2
(45) Date of Patent: Nov. 19, 2024

(54) DISPLAY DEVICE AND DRIVING METHOD THEREOF

(71) Applicant: Shenzhen China Star Optoelectronics Semiconductor Display Technology Co., Ltd., Guangdong (CN)

(72) Inventor: Yue Xi, Guangdong (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 0 days.

(21) Appl. No.: 17/607,544

(22) PCT Filed: Sep. 28, 2021

(86) PCT No.: PCT/CN2021/121139
§ 371 (c)(1),
(2) Date: Oct. 29, 2021

(87) PCT Pub. No.: WO2023/039945
PCT Pub. Date: Mar. 23, 2023

(65) Prior Publication Data
US 2024/0029674 A1    Jan. 25, 2024

(30) Foreign Application Priority Data
Sep. 16, 2021    (CN) .......................... 202111088054.4

(51) Int. Cl.
*G09G 3/34*    (2006.01)
*G09G 3/36*    (2006.01)

(52) U.S. Cl.
CPC ......... *G09G 3/3426* (2013.01); *G09G 3/3696* (2013.01); *G09G 2310/08* (2013.01);
(Continued)

(58) Field of Classification Search
CPC .............. G09G 3/3426; G09G 3/3696; G09G 2320/0233; G09G 2320/0626;
(Continued)

(56) References Cited

U.S. PATENT DOCUMENTS 7,088,058 B2    8/2006    Shiota et al.
10,699,625 B2   6/2020    Nonomura
(Continued)

FOREIGN PATENT DOCUMENTS

CN    106297696    1/2017
CN    106710563    5/2017
(Continued)

OTHER PUBLICATIONS

Notice of Reasons for Refusal Dated Nov. 14, 2023 From the Japan Patent Office Re. Application No. 2021-560009 and Its Translation Into English. (8 Pages).

*Primary Examiner* — Shaheda A Abdin (57) ABSTRACT

The present application discloses a display device and a driving method thereof. The method of driving the display device includes: acquiring a picture to be displayed; determining whether the picture to be displayed is a heavy-loaded picture; adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage; and driving the display device to display the picture to be displayed according to the second gamma voltage.

19 Claims, 6 Drawing Sheets

(52) U.S. Cl.
CPC ........... *G09G 2320/0276* (2013.01); *G09G 2320/0626* (2013.01); *G09G 2330/021* (2013.01)

(58) Field of Classification Search
CPC ... G09G 2320/0673; G09G 2320/0276; G09G 2330/021; G09G 2360/16; G09G 3/3614; G09G 2330/045; G09G 2310/08; Y02D 10/00

See application file for complete search history.

(56) References Cited

U.S. PATENT DOCUMENTS

| | | | | |
|---|---|---|---|---|
| 2008/0252624 | A1* | 10/2008 | Jang | G09G 3/3648 345/204 |
| 2008/0284768 | A1* | 11/2008 | Yoshida | G09G 3/2022 345/208 |
| 2012/0007894 | A1* | 1/2012 | Shin | G09G 3/3648 345/690 |
| 2013/0002641 | A1* | 1/2013 | Kim | G09G 3/3696 345/212 |
| 2013/0169615 | A1* | 7/2013 | Kobayashi | G09G 3/36 345/212 |
| 2021/0216162 | A1 | 7/2021 | Fang et al. | |
| 2024/0029675 | A1* | 1/2024 | Zhang | G09G 3/3426 |

FOREIGN PATENT DOCUMENTS

| | | |
|---|---|---|
| CN | 106782421 | 5/2017 |
| CN | 110070820 | 7/2019 |
| CN | 110635688 | 12/2019 |
| CN | 110969980 | 4/2020 |
| CN | 111883079 | 11/2020 |
| JP | 3541826 | 7/2004 |
| JP | 2012-093778 | 5/2012 |
| JP | 2017-111345 | 6/2017 |
| JP | 2019-101219 | 6/2019 |
| WO | WO 2005/009035 | 1/2005 |

* cited by examiner acquiring a picture to be displayed — 101 determining whether the picture to be displayed is a heavy-loaded picture — 102 adjusting a first gamma voltage corresponding to the picture to be displayed to a second gamma voltage if the picture to be displayed is the heavy-loaded picture, wherein corresponding to a same grayscale, a voltage value of the second gamma voltage is less than a voltage value of the first gamma voltage — 103 driving the display device to display the picture to be displayed according to the second gamma voltage. — 104

FIG. 1

```
┌─────────────────────────────────────────┐
│ acquiring brightness distribution characteristics │──1021
│ of the heavy-loaded picture              │
└─────────────────────────────────────────┘

┌─────────────────────────────────────────┐
│ acquiring brightness distribution characteristics │──1022
│ of the picture to be displayed           │
└─────────────────────────────────────────┘

┌─────────────────────────────────────────┐
│ comparing the brightness distribution    │
│ characteristics of the heavy-loaded picture with │
│ the brightness distribution characteristics of the │──1023
│ picture to be displayed, and determining the │
│ screen to be displayed is the heavy-loaded picture │
│ if the brightness distribution characteristics of │
│ the heavy-loaded picture are same as the │
│ brightness distribution characteristics of the │
│ picture to be displayed.                 │
└─────────────────────────────────────────┘
```

DISPLAY DEVICE AND DRIVING METHOD THEREOF

RELATED APPLICATIONS

This application is a National Phase of PCT Patent Application No. PCT/CN2021/121139 having International filing date of Sep. 28, 2021, which claims the benefit of priority of China Patent Application No. 202111088054.4 filed on Sep. 16, 2021. The contents of the above applications are all incorporated by reference as if fully set forth herein in their entirety.

FIELD AND BACKGROUND OF THE INVENTION

The present application relates to the field of display technology, in particular to a display device and a driving method thereof.

As people continue to pursue display quality, liquid crystal displays with high refresh rates (for example, 120 HZ) and high picture quality (for example, 8K) will inevitably become a future development trend. However, there will be some heavy-loaded pictures in a panel driving architecture with the high refresh rates and high picture quality. When displaying a heavy-loaded picture, there is a phenomenon that a data voltage frequently switches between a high level and a low level.

Due to a large voltage difference before and after switching, a temperature of a source driver will be too high, which will damage the source driver, make it unable to work normally, and cause a large amount of current consumption and increase power consumption of the display device. At present, industry usually adds a heat sink to a driving chip or selects a high-specification chip with high current resistance, high power consumption, etc. to solve an overheating problem of the driving chip, but this method will increase production cost and is not conducive to a mass production of the display device.

Therefore, there is an urgent need to propose a technical solution to solve the problem of high power consumption of heavy-loaded pictures.

SUMMARY OF THE INVENTION

The present application provides a display device and a driving method thereof, in order to solve the technical problem of excessive power consumption when the display device displays a heavy-loaded picture in the prior art.

The present application provides a method of driving a display device, which includes:
  acquiring a picture to be displayed;
  determining whether the picture to be displayed is a heavy-loaded picture;
  adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage; and
  driving the display device to display the picture to be displayed according to the second gamma voltage.

Optionally, in some embodiments of the present application, the step of adjusting the first gamma voltage corresponding to the picture to be displayed to the second gamma voltage includes:
  acquiring an analog power supply voltage of the display device, wherein the analog power supply voltage is used to generate the first gamma voltage;
  reducing a voltage value of the analog power supply voltage to adjust the first gamma voltage to the second gamma voltage.

Optionally, in some embodiments of the present application, the step of reducing the voltage value of the analog power supply voltage to adjust the first gamma voltage to the second gamma voltage includes:
  reducing the analog power supply voltage to a first voltage;
  acquiring a power consumption of the display device, and outputting the second gamma voltage based on the first voltage if the power consumption of the display device is less than a preset power consumption; and
  continuing to reduce the analog power supply voltage until the power consumption of the display device is less than the preset power consumption if the power consumption of the display device is greater than the preset power consumption.

Optionally, in some embodiments of the present application, the step of adjusting the first gamma voltage to the second gamma voltage includes:
  reducing the first gamma voltage corresponding to each of the gray scale to obtain the second gamma voltage corresponding to each of the gray scale according to a difference between a power consumption of the heavy-loaded picture and the preset power consumption.

Optionally, in some embodiments of the present application, the method of driving the display device further includes:
  acquiring a driving voltage of a source driving chip, wherein the source driving chip is configured to output the first gamma voltage or the second gamma voltage; and
  reducing a voltage value of the driving voltage if the picture to be displayed is the heavy-loaded picture.

Optionally, in some embodiments of the present application, the method of driving the display device further includes:
  increasing a brightness of a backlight of the display device if the picture to be displayed is the heavy-loaded picture.

Optionally, in some embodiments of the present application, the step of determining whether the picture to be displayed is a heavy-loaded picture includes:
  acquiring brightness distribution characteristics of the heavy-loaded picture;
  acquiring brightness distribution characteristics of the picture to be displayed;
  comparing the brightness distribution characteristics of the heavy-loaded picture with the brightness distribution characteristics of the picture to be displayed, and determining the picture to be displayed is the heavy-loaded picture if the brightness distribution characteristics of the heavy-loaded picture are same as the brightness distribution characteristics of the picture to be displayed.

Optionally, in some embodiments of the present application, the step of acquiring the brightness distribution characteristics of the heavy-loaded picture includes:
  acquiring a type of pixel-driving architecture of the display device; and
  determining brightness distribution characteristics of the picture to be displayed according to the type of the pixel-driving architecture.

Optionally, in some embodiments of the present application, the method of driving the display device further includes:

driving the display device to display the picture to be displayed according to the first gamma voltage if the picture to be displayed is a non-heavy-loaded picture frame.

Optionally, in some embodiments of the present application, before the step of driving the display device according to the second gamma voltage to display the picture to be displayed, the method further includes:

performing a gamma correction on the second gamma voltage according to a target gamma curve.

The present application also provides another method of driving a display device, which includes:

acquiring a picture to be displayed and brightness distribution characteristics of the picture to be displayed;

acquiring brightness distribution characteristics of a heavy-loaded picture;

determining whether the picture to be displayed is the heavy-loaded picture according to the brightness distribution characteristics of the picture to be displayed and the brightness distribution characteristics of the heavy-loaded picture;

adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage;

driving the display device to display the picture to be displayed according to the second gamma voltage; and driving the display device to display the picture to be displayed according to the first gamma voltage if the picture to be displayed is a non-heavy-loaded picture frame.

Optionally, in some embodiments of the present application, the step of adjusting the first gamma voltage corresponding to the picture to be displayed to the second gamma voltage includes:

acquiring an analog power supply voltage of the display device, wherein the analog power supply voltage is used to generate the first gamma voltage;

reducing a voltage value of the analog power supply voltage to adjust the first gamma voltage to the second gamma voltage.

Optionally, in some embodiments of the present application, the step of reducing the voltage value of the analog power supply voltage to adjust the first gamma voltage to the second gamma voltage includes:

reducing the analog power supply voltage to a first voltage;

acquiring a power consumption of the display device, and outputting the second gamma voltage based on the first voltage if the power consumption of the display device is less than a preset power consumption; and continuing to reduce the analog power supply voltage until the power consumption of the display device is less than the preset power consumption if the power consumption of the display device is greater than the preset power consumption.

Optionally, in some embodiments of the present application, the step of adjusting the first gamma voltage to the second gamma voltage includes:

reducing the first gamma voltage corresponding to each of the gray scale to obtain the second gamma voltage corresponding to each of the gray scale according to a difference between a power consumption of the heavy-loaded picture and the preset power consumption.

Optionally, in some embodiments of the present application, the method of driving the display device further includes:

acquiring a driving voltage of a source driving chip, wherein the source driving chip is configured to output the first gamma voltage or the second gamma voltage; and reducing a voltage value of the driving voltage if the picture to be displayed is the heavy-loaded picture.

Optionally, in some embodiments of the present application, the method of driving the display device further includes:

increasing a brightness of a backlight of the display device if the picture to be displayed is the heavy-loaded picture.

Optionally, in some embodiments of the present application, the step of acquiring the brightness distribution characteristics of the heavy-loaded picture includes:

acquiring a type of pixel-driving architecture of the display device; and determining brightness distribution characteristics of the picture to be displayed according to the type of the pixel-driving architecture.

Correspondingly, the present application also provides a display device, which includes:

an acquiring module configured to obtain a picture to be displayed;

an detection module configured to determine whether the picture to be displayed is a heavy-loaded picture;

an adjustment module configured to adjust a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage; and a driving module configured to drive the display device to display the picture to be displayed according to the second gamma voltage.

Optionally, in some embodiments of the present application, the adjustment module is further configured to adjust the second gamma voltage according to a target gamma voltage curve.

Optionally, in some embodiments of the present application, the adjustment module is further configured to increase a brightness of a backlight of the display device when the picture to be displayed is the heavy-loaded picture.

The present application provides a display device and a driving method thereof. The method of driving a display device includes: acquiring a picture to be displayed; determining whether the picture to be displayed is a heavy-loaded picture; adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage; and driving the display device to display the picture to be displayed according to the second gamma voltage. The present application reduces the first gamma voltage corresponding to the heavy-loaded picture, and uses the second gamma voltage to drive the display device to display the heavy-loaded picture, which can reduce power consumption of the display device when displaying the heavy-loaded picture, prevent increase in the temperature of the source driver chip to impact the display quality, and solve overheating problem of the source driving chip when displaying heavy-loaded pictures at a lower cost.

BRIEF DESCRIPTION OF THE SEVERAL VIEWS OF THE DRAWINGS

In order to more clearly illustrate the technical solutions of the embodiments of the application, the drawings illustrating the embodiments will be briefly described below. Obviously, the drawings in the following description merely illustrate some embodiments of the present invention. Other drawings may also be obtained by those skilled in the art according to these FIGS. without paying creative work.

DESCRIPTION OF SPECIFIC EMBODIMENTS OF THE INVENTION

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application. In addition, it should be understood that the specific implementations described here are only used to illustrate and explain the application, and are not used to limit the application. In the present application, unless otherwise stated, the orientation words used such as "upper" and "lower" generally refer to the upper and lower directions of the device in actual use or working state, and specifically refer to the drawing directions in the drawings, while "inner" and "outer" refer to the outline of the device.

The present application provides a display device and a driving method thereof, which will be described in detail below. It should be noted that the order of description in the following embodiments is not intended to limit the preferred order of the embodiments.

In the method of driving the display device provided in the present application, the picture to be displayed is first acquired. Then, it is determined whether the picture to be displayed is a heavy-loaded picture. If the picture to be displayed is a heavy-loaded picture, a first gamma voltage corresponding to the picture to be displayed is adjusted to a second gamma voltage, wherein corresponding to a same gray scale, a voltage value of the second gamma voltage is less than a voltage value of the first gamma voltage. Finally, the display device is driven to display the picture to be displayed according to the second gamma voltage.

It is appreciated that a theoretical calculation formula for the power consumption of the display device is: $P=a*f*C*V^2$, wherein "a" is a power consumption coefficient, "f" is a line refresh rate of the display device, "C" is a panel capacitance in the display device, and "V" is a variation amplitude of a data voltage on a same data line. It can be seen that, by reducing the first gamma voltage corresponding to the heavy-loaded picture and using the second gamma voltage to drive the display device to display the heavy-loaded picture, the present application can reduce the variation amplitude of the data voltage on the same data line, thereby reducing the power consumption of the display device when displaying the heavy-loaded picture.

In addition, the present application transforms the heavy-loaded picture into a non-heavy-loaded picture (light-loaded picture), and finally displays the light-loaded picture, so that under a premise of maintaining an overall brightness of the picture to be displayed, a brightness change between adjacent rows of sub-pixels driven by the same data line is reduced, thereby reducing a load of a source driving chip. The problem of overheating when the source driving chip displays a heavy-loaded picture is solved at a lower cost, while preventing a temperature rise of the source driving chip from impacting the display quality.

The detailed introduction is given below.

Figure 1:
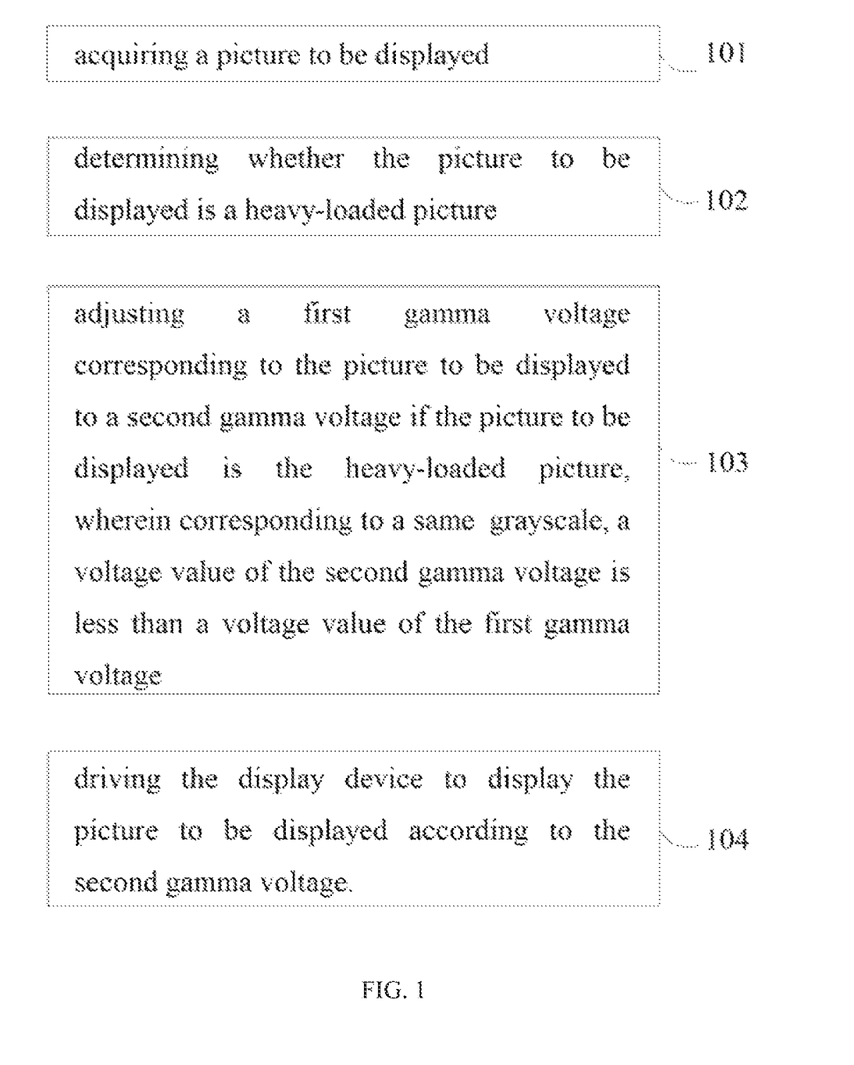
FIG. 1 is a schematic flowchart of a method of driving a display device provided by the present application.

Referring to FIG. 1, FIG. 1 is a schematic flowchart of a method of driving a display device provided by the present application. In the present application, the method of driving the display device specifically includes the following steps:

101. acquiring a picture to be displayed.

Generally, the system on chip (SOC) of the display device outputs a video signal to a timer controller (TCON). The timing control chip analyzes a video signal to obtain data information of the picture to be displayed.

102. determining whether the picture to be displayed is a heavy-loaded picture.

Specifically, the analyzed data information of the picture to be displayed is processed by a timing control chip, and a brightness information of the picture to be displayed can be obtained. Then, according to the brightness information of the picture to be displayed, it is determined whether the picture to be displayed is a heavy-loaded picture.

Figure 2:
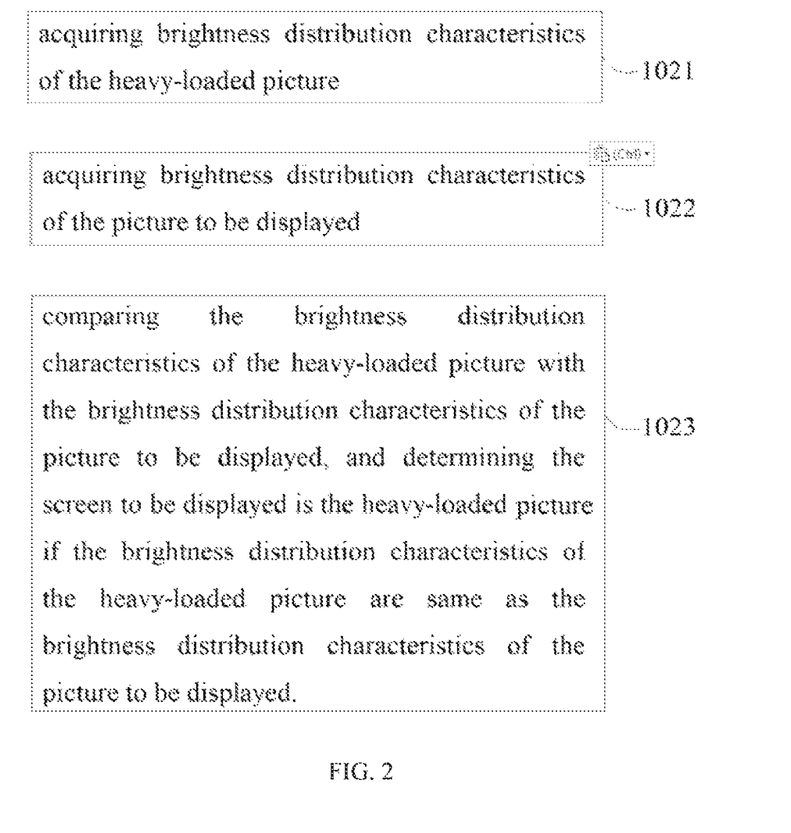
FIG. 2 is a schematic flowchart of step 102 in FIG. 1.

In some embodiments, please refers to FIG. 2, which is a schematic flowchart of step 102 in FIG. 1. Step 102 includes the following steps:

1021. acquiring brightness distribution characteristics of the heavy-loaded picture.

It should be noted that under different types of the pixel-driving architectures, the heavy-loaded picture of the display device has different brightness distribution characteristics. Therefore, in this step, it is first necessary to obtain the pixel driving architecture type of the display device. Then, the brightness distribution characteristics of the heavy-loaded picture are determined according to the types of the pixel-driving architectures.

Figure 3A:
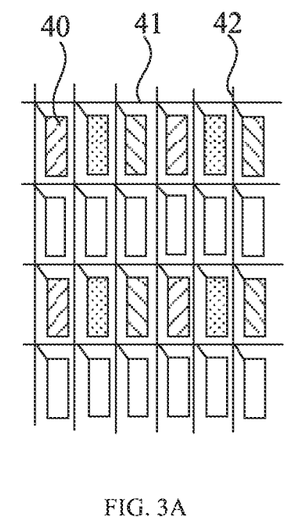
FIGS. 3A, 3B and 3C are schematic structural diagrams of the display device provided by the present application under a first driving architecture for reloading a picture.
Figure 3B:
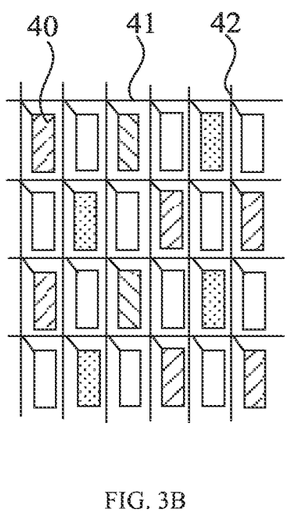
Figure 3C:
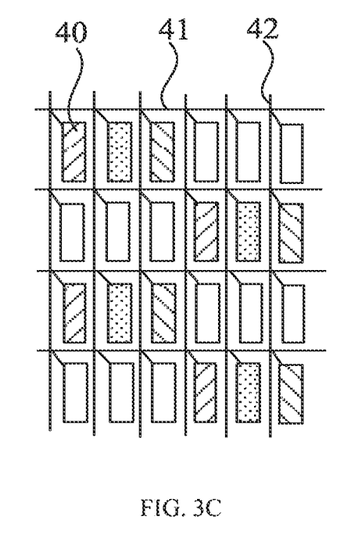
Figure 4A:
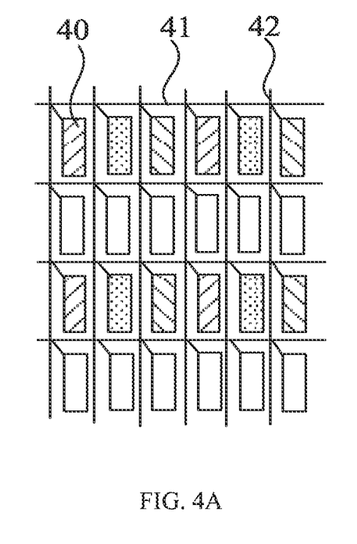
FIGS. 4A-4B are schematic structural diagrams of the display device provided by the present application under a second driving architecture for reloading a picture.
Figure 4B:
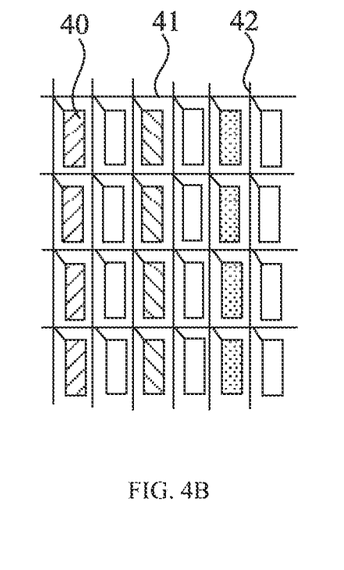

Specifically, referring to FIGS. 3A-3C and 4A-4B, FIGS. 3A-3C are schematic structural diagrams of the display device provided by the present application for reloading the picture under a first driving architecture, and FIGS. 4A-4B are schematic structural diagrams of the display device provided by the present application for reloading the picture under a second driving architecture.

FIG. 3A is taken as an example for illustration of the present application. The display device includes a plurality of data lines 41, a plurality of scan lines 42, and sub-pixels 40 arranged in an array. The data lines 41 and the scan lines 42 are arranged to cross each other. Each of the sub-pixels 40 is connected to corresponding ones of the data lines 41 and the scan lines 42 and is defined by an intersection of the data line 41 and the scan line 42. Every three of the sub-pixels 40 constitute a pixel unit. Of course, the pixel driving architecture illustrated in the present application is only an example and should not be understood as a limitation on the present application.

The first driving architecture refers to a conventional driving architecture, and the second driving architecture refers to a driving architecture with polarity inversion characteristics. It is appreciated that since liquid crystal molecules are polarized under driving by a direct current voltage and cause picture sticking, the pixel driving signal adopts a driving method where alternate positive and negative voltages are applied to drive the liquid crystal molecules. Then the second driving architecture mainly includes frame inversion, column inversion, row inversion, dot inversion, etc. according to different polarity inversion modes.

Under the first driving architecture, as shown in FIG. 3A, the heavy-loaded picture is an H-strip picture. The brightness distribution characteristics of the H-strip picture under the first driving architecture are that: in two adjacent rows of sub-pixels 40, one row of sub-pixels 40 is bright, and another one row of sub-pixels 40 is dark. Corresponding to an RGB brightness, that is, when a first one of the rows of sub-pixels 40 is at a high potential 1, a second one of the rows of sub-pixels 40 is at a low potential of 0. Correspondingly, gray scale values of L128-L255 can be set to high potential, that is, 1; L0-L127 are low potential, that is, 0.

In the present application, a picture display data of the display panel is binary 8-bit, that is, generating 256 different brightness gray scales (for example, recorded as the 0th gray scale to the 255th gray scale) is taken as an example, but it cannot be regarded as a limitation of the present application. As shown in FIG. 3B, the heavy-loaded picture is a dot-on-off picture. The characteristic of the brightness distribution of the dot-on-off picture is that: in two adjacent sub-pixels 40, one sub-pixel 40 is bright and one sub-pixel 40 is dark. That is, when a first one of the sub-pixels is at a high potential 1, a second one of the sub-pixels 40 is at a low potential. As shown in FIG. 3C, the heavy-loaded picture is a pixel-on-off picture. The brightness distribution characteristics of the pixel-on-off picture are that: in two adjacent pixel units, three sub-pixels 40 in one of the pixel units are all bright, and three sub-pixels 40 in another one of the pixel units are all dark.

Under the second driving architecture, as shown in FIG. 4A, the heavy-loaded picture is also an H-strip picture. The difference from the H-strip picture shown in FIG. 3A is that the heavy-loaded picture is displayed under a row inversion driving architecture. That is, in two adjacent rows of sub-pixels 40, one row of sub-pixels 40 corresponds to a positive polarity voltage, and another row of sub-pixels 40 corresponds to a negative polarity voltage. As shown in FIG. 4B, this heavy-loaded picture is displayed under a column inversion driving architecture. This heavy-loaded picture is a V-strip picture, and brightness distribution characteristics of the V-strip picture are that: in two adjacent columns of sub-pixels 40, one column of sub-pixels 40 is bright, and another column of sub-pixels 40 is dark. In other words, corresponding to the RGB brightness, one column of sub-pixels has a high potential of 1, and another column of sub-pixels has a low potential of 0.

Further, the brightness distribution characteristics of the heavy-loaded picture can be input into the timing control chip. A storage unit can be set inside the timing control chip to store the brightness distribution characteristics of the heavy-loaded picture. In addition, the brightness distribution characteristic of the heavy-loaded picture can be stored in the timing control chip in a form of a code.

Inputting the brightness distribution characteristics of the heavy-loaded picture into the timing control chip generally has two dimensions. One is a dimension of RGB brightness, and another one is a dimension of picture coordinates and areas.

Therefore, according to the driving architecture of the display device, the present application inputs the brightness distribution characteristics corresponding to the heavy-loaded picture into the timing control chip for subsequent operations. It should be noted that the heavy-loaded pictures under different driving architectures are not limited to the above examples, and therefore cannot be understood as a limitation of the present application.

1022. acquiring brightness distribution characteristics of the picture to be displayed.

Specifically, the analyzed data information of the picture to be displayed is processed by the timing control chip to obtain a display gray scale of each sub-pixel of the picture to be displayed. According to a relationship between the display gray scale and the display brightness, the brightness distribution characteristics of the picture to be displayed can be obtained.

1023. comparing the brightness distribution characteristics of the heavy-loaded picture with the brightness distribution characteristics of the picture to be displayed, and determining the screen to be displayed is the heavy-loaded picture screen if the brightness distribution characteristics of the heavy-loaded picture are same as the brightness distribution characteristics of the picture to be displayed.

Specifically, the brightness distribution characteristics of the picture to be displayed are compared with the brightness distribution characteristics of the heavy-loaded picture. If the brightness distribution characteristics of the picture to be displayed are the same as the brightness distribution characteristics of the heavy-loaded picture, it is determined that the picture to be displayed is the heavy-loaded picture. If the brightness distribution characteristics of the picture to be displayed are different from the brightness distribution characteristics of the heavy-loaded picture, it is determined that the picture to be displayed is a non-heavy-loaded picture.

For example, the V-strip picture shown in FIG. 3A is taken as an example for description. It can be seen from the above embodiment that the brightness distribution characteristics of the V-strip picture are: in the two adjacent rows of sub-pixels 40, the first one of the rows of sub-pixels 40 is at a high potential 1, and the second one of the rows of sub-pixels 40 is at a low potential of 0. Then, dimensions of coordinates and areas are detected, and such a detection can be performed from an upper left corner (0, 0) to (540, 960), that is, the detection is performed from the sub-pixel 40 located in the first row and first column to the sub-pixel 40 located in the 540th row to the 960th column. If the detected sub-pixels 40 are all arranged according to the characteristic values of the V-strip picture, such a case is recognized as a V-strip picture. Of course, it is also possible to detect brightness and darkness of each sub-pixel 40 to compare with the brightness distribution characteristics of the heavy-loaded picture, which will not be repeated herein for brevity.

103. adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage.

Specifically, in some embodiments of the present application, the step of adjusting the first gamma voltage corresponding to the picture to be displayed to the second gamma voltage includes:

1031. acquiring an analog power supply voltage of the display device, wherein the analog power supply voltage is used to generate the first gamma voltage.

It is appreciated that the display device usually includes a gamma voltage divider circuit or a gamma chip. The gamma voltage divider circuit or gamma chip is connected to an analog power supply voltage to output the gamma voltage under a control of the analog power supply voltage. A voltage value of the analog power supply voltage VAA can be set according to display brightness requirements of the display device. A reference voltage is usually a ground voltage. Thus, the analog power supply voltage determines the voltage value of the gamma voltage output by the gamma voltage divider circuit or the gamma chip.

1032. reducing a voltage value of the analog power supply voltage to adjust the first gamma voltage to the second gamma voltage.

Specifically, the present application is described by taking the display device including the gamma voltage divider circuit as an example. Please refers to FIG. 5, which is a schematic structural diagram of a gamma voltage divider circuit provided by the present application. The gamma voltage divider circuit 20 includes a plurality of voltage divider resistors connected in series (not shown). Multiple series-connected voltage divider resistors are connected to the analog power supply voltage VAA and the reference voltage VSS. The gamma voltage divider circuit 20 can output multiple grayscale bonding point voltages, such as GMA1 to GMA14. Gamma voltages corresponding to other gray scales can be obtained by interpolation based on gray scale bonding point voltages and a target gamma curve, which will not be repeated herein for brevity.

Figure 5:
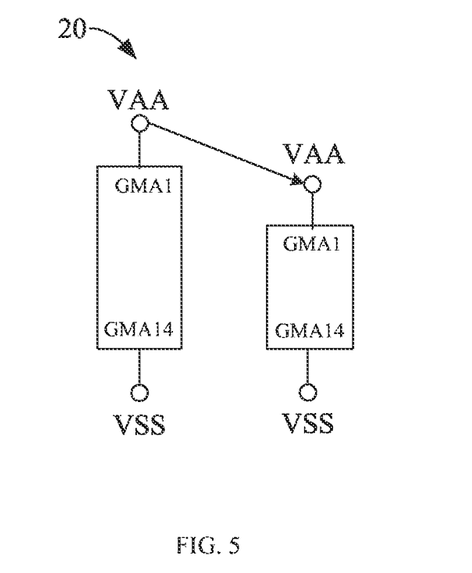
FIG. 5 is a schematic structural diagram of a gamma voltage divider circuit provided by the present application.

Therefore, in the present application, the first gamma voltage is adjusted to the second gamma voltage by reducing the voltage value of the analog power supply voltage VAA. A requirement that the voltage value of the second gamma voltage corresponding to the same gray scale is smaller than the voltage value of the first gamma voltage can be met. In addition, a power consumption caused by the analog power supply voltage VAA is a power consumption of in-plane pumping. When displaying heavy-loaded pictures, the power consumption of the analog power supply voltage VAA of some display devices can reach more than 50% of a total power consumption. Therefore, the present application reduces the analog power supply voltage VAA and adjusts the first gamma voltage to the second gamma voltage, which can effectively reduce the power consumption of the display device when displaying a heavy-loaded picture.

Optionally, in some embodiments of the present application, step 1032 includes the following steps:

1032A. reducing the analog power supply voltage to a first voltage.

Specifically, the analog power supply voltage VAA is usually provided by a power management IC (power management integrated circuit, PMIC). Therefore, if it is determined that the picture to be displayed is a heavy-loaded picture, the PMIC reduces the analog power supply voltage VAA to a first voltage, and outputs the first voltage to the gamma voltage divider circuit 20 to obtain the second gamma voltage.

1032B. acquiring a power consumption of the display device, and outputting the second gamma voltage based on the first voltage if the power consumption of the display device is less than a preset power consumption.

It is appreciated that different customers have different requirements for the power consumption of the display device. For example, in a test of a certain type of the display device, a white picture power consumption of the display device is 3.1 W, and the heavy-loaded picture power consumption is usually 4.2 W. If a maximum power consumption required by a customer does not exceed 3.6 W, it is necessary to reduce the analog power supply voltage VAA, and then obtain an actual power consumption of the display device through measurement, until the analog power supply voltage VAA is reduced to 3.6 W. A preset power consumption is a power consumption specification requirement when the display device displays the heavy-loaded picture, which can be specifically set according to actual requirements of the customer, which is not specifically limited in the present application.

Therefore, the power consumption of the display device can be detected under driving of the analog power supply voltage VAA and the second gamma voltage. If the power consumption of the display device is less than the preset power consumption, the gamma voltage divider circuit 20 outputs the second gamma voltage based on the first voltage, and the second gamma voltage is stored in the storage unit.

1032C. continuing to reduce the analog power supply voltage until the power consumption of the display device is less than the preset power consumption if the power consumption of the display device is greater than the preset power consumption.

It is appreciated that since corresponding to a same gray scale, the second gamma voltage is smaller than the first gamma voltage, reducing the power consumption of the heavy-loaded picture will actually reduce the brightness of the heavy-loaded picture. That is, this solution will not impact display of the heavy-loaded picture, but the overall picture brightness is reduced. Therefore, in the process of actually adjusting the analog power supply voltage VAA, it is necessary to gradually reduce the analog power supply voltage VAA, so as to reduce the power consumption of the heavy-loaded picture while ensuring that an overall brightness of the heavy-loaded picture is less impacted.

Therefore, if the power consumption of the display device is still greater than the preset power consumption when the analog power supply voltage VAA is reduced to the first voltage, it is necessary to continue to reduce the analog power supply voltage until the power consumption of the display device is less than the preset power consumption. It should be noted that a reduction range of the analog power supply voltage VAA can be set according to a difference between the power consumption of the heavy-loaded picture and the preset power consumption, which is not specifically limited in the present application.

In some other embodiments of the present application, the step of adjusting the first gamma voltage to the second gamma voltage includes:

1033. reducing the first gamma voltage corresponding to each of the gray scale to obtain the second gamma voltage corresponding to each of the gray scale according to a difference between a power consumption of the heavy-loaded picture and the preset power consumption.

Specifically, a reduction amount of the first gamma voltage corresponding to each gray scale can be set according to the difference between the power consumption of the heavy-loaded picture and the preset power consumption. The reduction amount of the first gamma voltage corresponding to each gray scale may be the same or different. For example, a brightness difference at a low gray scale observed by a human eye is large, while a brightness difference at a high gray scale observed by a human eye is small. Therefore, a difference between the first gamma voltage and the second gamma voltage corresponding to the low gray scale can be smaller than the difference between the first gamma voltage and the second gamma voltage corresponding to the high gray scale, so as to prevent impacting the display of the heavy-loaded picture.

Specifically, a logic unit can be added to a source driving chip or the PMIC to achieve a function of reducing the first gamma voltage corresponding to each gray scale to obtain the second gamma voltage.

Further, in some embodiments, the second gamma voltage is required to meet a target gamma voltage curve. It is appreciated that a brightness perceived by the human eye is not linearly related to an actual display brightness of the display panel. In a low-brightness environment, human eyes are more sensitive to changes in brightness, while in a high-brightness environment are less sensitive. This characteristic of the human eye is called a gamma characteristic. Due to a non-linear perception of brightness characteristic of the human eye's non-linear perception of brightness, if a uniformly varying brightness experience is required to obtain, the brightness displayed by the display panel needs to vary non-uniformly to adapt to the gamma characteristic of the human eye. Non-linear parameters of the brightness and gray scales of the display panel can be called gamma parameters, and a brightness and gray scale curve drawn according to the gamma parameters are called a gamma curve. The gamma parameter addresses a non-linear relationship between brightness and gray scales, that is, the non-linear relationship between brightness and gamma voltages. Therefore, if the brightness and gray scales of the display panel do not meet the target gamma curve, the gamma voltages of the display panel need to be corrected. In this embodiment, the target gamma curve may be a gamma curve with a gamma parameter of 2.2.

In the present application, the second gamma voltage is used to drive the display device to display the heavy-loaded picture, and its purpose is to reduce the power consumption of the heavy-loaded picture. However, while reducing the power consumption of the heavy-loaded picture, it is also necessary to consider the display effect of the heavy-loaded picture. Therefore, while adjusting the first gamma voltage to the second gamma voltage, the second gamma voltage meets the target gamma curve, which can improve the display effect and user's experience.

104. driving the display device to display the picture to be displayed according to the second gamma voltage.

The first gamma voltage and the second gamma voltage are stored in different address locations in the storage unit. If the PMIC in the display device is a separate type, the storage unit is provided inside the PMIC. If the PMIC is a three-in-one PMIC, that is, a PMIC, a level-shift IC chip, and a gamma IC chip are integrated in a same chip. The storage unit may be an external electrically erasable programmable read only memory (EEPROM) type or a flash memory type. When the picture to be displayed is a heavy-loaded picture, the timing control chip adopts the second gamma voltage in the storage unit. Then, the timing control chip issues an instruction to the PMIC through an inter-integrated circuit (IIC, I2C), and the PMIC receives the instruction and outputs the second gamma voltage to the source driving chip. The source driving chip outputs the second gamma voltage to the display panel through data lines to display the heavy-loaded picture.

In addition, if the picture to be displayed is a non-heavy-loaded picture, the timing control chip adopts? the first gamma voltage in the storage unit through activation by the I2C. The source driving chip drives the display device to display the picture to be displayed according to the first gamma voltage.

Figure 6:
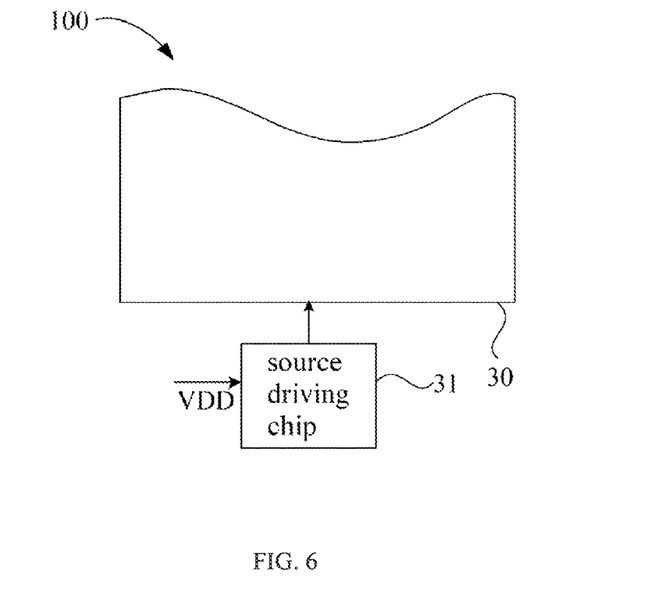
FIG. 6 is a schematic diagram of a first structure of the display device provided by the present application.

In some embodiments of the present application, referring to FIG. 6, FIG. 6 is a schematic diagram of a first structure of the display device provided by the present application. The display device 100 includes a source driving chip 31 and a display panel 30. The source driving chip 31 is configured to output the first gamma voltage or the second gamma voltage to the display panel 30.

A difference from the method of driving the display device shown in FIG. 1 is that, in this embodiment, the method of driving the display device further includes the following steps:

105. acquiring a driving voltage of a source driving chip, wherein the source driving chip is configured to output the first gamma voltage or the second gamma voltage.

The source driving chip 31 works normally under the driving of the driving voltage. The source driving chip 31 outputs the first gamma voltage or the second gamma voltage to the display panel 30 through the data lines. A number of source driving chips 31 can be set according to a size of the display panel 30 and a pixel resolution.

106. reducing a voltage value of the driving voltage if the picture to be displayed is the heavy-loaded picture.

It is appreciated that each source driving chip 31 is required to be driven by a certain range of driving voltage VDD to work normally. Therefore, when the display device 100 displays a heavy-loaded picture, the driving voltage VDD of the source driving chip 31 can also be reduced to reduce the power consumption of the display device 100 and a temperature of the source driving chip 31. For example, the driving voltage VDD of the source driving chip 31 can be adjusted in the range of 2.9V-3.3V.

Figure 7:
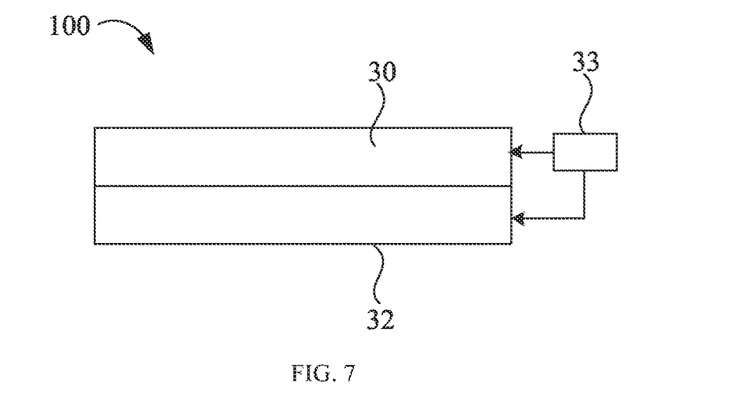
FIG. 7 is a schematic diagram of a second structure of the display device provided by the present application.

Further, referring to FIG. 7, FIG. 7 is a schematic diagram of a second structure of the display device provided by the present application. The display device 100 includes a backlight module 32 and a display panel 30. The backlight module 32 is configured to provide backlight to the display panel 30.

A difference from the method of driving the display device shown in FIG. 1 is that, in this embodiment, the method of driving the display device further includes the following steps:

107. increasing a brightness of a backlight of the display device if the picture to be displayed is the heavy-loaded picture.

It can be seen from the above-mentioned embodiments that reducing the power consumption of the heavy-loaded picture will reduce the overall brightness of the heavy-loaded picture. Generally, according to a measured data, when the power consumption of the heavy-loaded picture is reduced to 80% of the original, the overall brightness is reduced by about 10%.

Therefore, in order to reduce the power consumption of the heavy-loaded picture while ensuring that the display brightness of the heavy-loaded picture remains unchanged as a whole, the present embodiment increases performance of a backlight module 32 when the display device 100 is driven to display the heavy-loaded picture according to the second gamma voltage. The brightness of the backlight can increase the brightness of the heavy-loaded picture, thereby compensating for a decrease in the brightness caused by a decrease in the driving voltage.

Specifically, by increasing the driving voltage of a light source in the backlight module 32, a driving current of the backlight source can be increased, thereby increasing a backlight brightness of the backlight module 32. Of course, the present application is not limited thereto. Specifically, a method of increasing the brightness of the backlight can be selected according to a light source structure of the backlight module 32.

Further, in some embodiments of the present application, the display device 100 further includes a timing control chip 33. The timing control chip 33 is connected to the backlight module 32. If the picture to be displayed is a heavy-loaded picture, the timing control chip 33 sends a control signal to the backlight module 32. The backlight module 32 increases the brightness of the backlight based on the control signal. In this embodiment, by establishing a communication relationship between the timing control chip 33 and the backlight module 32, when the timing control chip 33 recognizes a heavy-loaded picture, the control signal can be fed back to the backlight module 32 in time, so as to control and adjust the backlight brightness of the backlight module 32.

Correspondingly, the present application also provides a display device, which displays a picture to be displayed under the method of driving the display device described in any of the above embodiments. The method of driving the display device can be referred to the above-mentioned embodiments, which will not be repeated herein for brevity.

The display device in the present application may be a smart phone, a tablet computer, a video player, a personal computer (PC), etc., which is not particularly limited in the present application.

Figure 8:
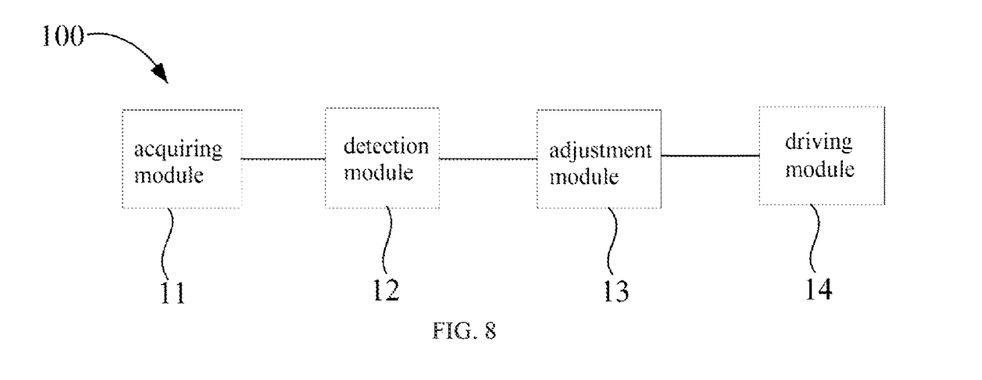
FIG. 8 is a schematic diagram of a third structure of the display device provided by the present application.

Specifically, referring to FIG. 8, FIG. 8 is a schematic diagram of a third structure of the display device provided by the present application. The display device 100 includes: an acquiring module 11, a detection module 12, an adjustment module 13 and a driving module 14, which are described specifically as follows:

(1) Acquiring Module 11;

The acquiring module 11 is configured to obtain a picture to be displayed. Generally, the acquiring module 11 can be provided in a timing control chip. A storage unit can be set inside the timing control chip to store relevant information of the picture to be displayed.

(2) Detection Module 12;

The detection module 12 is configured to determine whether the picture to be displayed is a heavy-loaded picture. Specifically, the detection module 12 may process the parsed data information of the picture to be displayed to obtain a display gray scale of each sub-pixel of the picture to be displayed. According to a relationship between display gray scales and display brightness, brightness distribution characteristics of the picture to be displayed can be obtained. Then, it is determined whether the picture to be displayed is a heavy-loaded picture according to the brightness distribution characteristics of the picture to be displayed.

Specifically, the detection module 12 can detect a type of the pixel driving architecture of the display device 100. Then, the brightness distribution characteristics of the heavy-loaded picture are determined according to the type of pixel-driving architecture. In addition, the brightness distribution characteristics of the heavy-loaded picture are input into the timing control chip. Finally, the brightness distribution characteristics of the picture to be displayed is compared with the brightness distribution characteristics of the heavy-loaded picture. If the brightness distribution characteristics of the picture to be displayed are the same as the brightness distribution characteristics of the heavy-loaded picture, it is determined that the picture to be displayed is the heavy-loaded picture. If the brightness distribution characteristics of the picture to be displayed are different from the brightness distribution characteristics of the heavy-loaded picture, it is determined that the picture to be displayed is a non-heavy-loaded picture.

The brightness distribution characteristics of the heavy-loaded picture can be referred to the above-mentioned embodiments, and will not be repeated herein for brevity.

(3) Adjustment Module 13;

The adjustment module 13 is configured to determine whether the picture to be displayed is a heavy-loaded picture according to the brightness distribution characteristics of the heavy-loaded picture. If the picture to be displayed is a heavy-loaded picture, the first gamma voltage corresponding to the picture to be displayed is adjusted to the second gamma voltage. Corresponding to a same gray scale, the second gamma voltage is smaller than the first gamma voltage.

Specifically, in some embodiments, the adjustment module 13 can adjust the first gamma voltage to the second gamma voltage by reducing an voltage value of an analog power supply voltage. The analog power supply voltage is used to generate the first gamma voltage. Details can be referred to the above-mentioned embodiments, which will not be repeated herein for brevity.

In other embodiments, the adjustment module 13 may reduce the first gamma voltage corresponding to each gray scale according to a difference between the power consumption of the heavy-loaded picture and the preset power consumption, so as to obtain the second gamma corresponding each gray scale.

Further, the second gamma voltage can be adjusted to meet a target gamma voltage curve, such that while reducing the power consumption of the heavy-loaded picture, a display effect and user's experience are improved.

Optionally, if the picture to be displayed is a heavy-loaded picture, the adjustment module 13 may also reduce the power consumption of the display device 100 by reducing a voltage value of a driving voltage. The driving voltage is used to drive a source driving chip to work normally. The source driving chip is configured to output the first gamma voltage or the second gamma voltage.

Optionally, if the picture to be displayed is a heavy-loaded picture, the adjustment module 13 may also increase a brightness of a backlight of the display device 100. It is appreciated that reducing the power consumption of the heavy-loaded picture will reduce the overall brightness of the heavy-loaded picture. Therefore, in order to reduce the power consumption of the heavy-loaded picture while ensuring that the display brightness of the heavy-loaded picture remains unchanged as a whole, the present embodiment increases performance of a backlight module 32 when the display device 100 is driven to display the heavy-loaded picture according to the second gamma voltage. The brightness of the backlight can increase the brightness of the heavy-loaded picture, thereby compensating for a decrease in the brightness caused by a decrease in the driving voltage.

(4) Driving Module 14;

When the picture to be displayed is a heavy-loaded picture, the driving module 14 is configured to drive the display device 100 to display the heavy-loaded picture according to the second gamma voltage. When the picture to be displayed is a non-heavy-loaded picture, the driving module 14 is configured to drive the display device 100 to display the non-heavy-loaded picture according to the first gamma voltage.

The present application provides a display device 100, and the display device 100 can display pictures by a method of driving the display device. The method of driving the display device 100 includes: acquiring a picture to be displayed; then determining whether the picture to be displayed is a heavy-loaded picture; then adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage; and finally driving the display device to display the picture to be displayed according to the second gamma voltage. The present application can reduce power consumption of the display device when displaying the heavy-loaded picture and prevent an increase in temperature from impacting the display quality, while reducing production cost.

The display device and the driving method thereof provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A method of driving a display device, comprising:
acquiring a picture to be displayed;
determining whether the picture to be displayed is a heavy-loaded picture;
adjusting a first gamma voltage corresponding to the picture to be displayed to a second gamma voltage if the picture to be displayed is the heavy-loaded picture, wherein a voltage value of the second gamma voltage corresponding to a same grayscale is less than a voltage value of the first gamma voltage; and
driving the display device to display the picture to be displayed according to the second gamma voltage,
wherein the step of determining whether the picture to be displayed is a heavy-loaded picture comprises:
acquiring brightness distribution characteristics of the heavy-loaded picture;
acquiring brightness distribution characteristics of the picture to be displayed;
comparing the brightness distribution characteristics of the heavy-loaded picture with the brightness distribution characteristics of the picture to be displayed, and determining the picture to be displayed is the heavy-loaded picture if the brightness distribution characteristics of the heavy-loaded picture are same as the brightness distribution characteristics of the picture to be displayed.

2. The method of driving the display device according to claim 1, wherein the step of adjusting the first gamma voltage corresponding to the picture to be displayed to the second gamma voltage comprises:
acquiring an analog power supply voltage of the display device, wherein the analog power supply voltage is used to generate the first gamma voltage;
reducing a voltage value of the analog power supply voltage to adjust the first gamma voltage to the second gamma voltage.

3. The method of driving the display device according to claim 2, wherein the step of reducing the voltage value of the analog power supply voltage to adjust the first gamma voltage to the second gamma voltage comprises:
reducing the analog power supply voltage to a first voltage;
acquiring a power consumption of the display device, and outputting the second gamma voltage based on the first voltage if the power consumption of the display device is less than a preset power consumption; and
continuing to reduce the analog power supply voltage until the power consumption of the display device is less than the preset power consumption if the power consumption of the display device is greater than the preset power consumption.

4. The method of driving the display device according to claim 1, wherein the step of adjusting the first gamma voltage to the second gamma voltage comprises:
reducing the first gamma voltage corresponding to each of the gray scale to obtain the second gamma voltage corresponding to each of the gray scale according to a difference between a power consumption of the heavy-loaded picture and the preset power consumption.

5. The method of driving the display device according to claim 1, wherein the method of driving the display device further comprises:
acquiring a driving voltage of a source driving chip, wherein the source driving chip is configured to output the first gamma voltage or the second gamma voltage; and
reducing a voltage value of the driving voltage if the picture to be displayed is the heavy-loaded picture.

6. The method of driving the display device according to claim 1, wherein the method of driving the display device further comprises:
increasing a brightness of a backlight of the display device if the picture to be displayed is the heavy-loaded picture.

7. The method of driving the display device according to claim 1, wherein the step of acquiring the brightness distribution characteristics of the heavy-loaded picture comprises:
acquiring a type of pixel-driving architecture of the display device; and
determining brightness distribution characteristics of the picture to be displayed according to the type of the pixel-driving architecture.

8. The method of driving the display device according to claim 1, wherein the method of driving the display device further comprises:
driving the display device to display the picture to be displayed according to the first gamma voltage if the picture to be displayed is a non-heavy-loaded frame.

9. The method of driving a display device according to claim 1, wherein before the step of driving the display device according to the second gamma voltage to display the picture to be displayed, the method further comprises:
performing a gamma correction on the second gamma voltage according to a target gamma curve.

10. A method of driving a display device, comprising:
acquiring a picture to be displayed and brightness distribution characteristics of the picture to be displayed;
acquiring brightness distribution characteristics of a heavy-loaded picture;

determining whether the picture to be displayed is the heavy-loaded picture according to the brightness distribution characteristics of the picture to be displayed and the brightness distribution characteristics of the heavy-loaded picture;

adjusting a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage;

driving the display device to display the picture to be displayed according to the second gamma voltage; and driving the display device to display the picture to be displayed according to the first gamma voltage if the picture to be displayed is a non-heavy-loaded frame, wherein determining whether the picture to be displayed is the heavy-loaded picture according to the brightness distribution characteristics of the picture to be displayed and the brightness distribution characteristics of the heavy-loaded picture comprises: comparing the brightness distribution characteristics of the heavy-loaded picture with the brightness distribution characteristics of the picture to be displayed, and determining the picture to be displayed is the heavy-loaded picture if the brightness distribution characteristics of the heavy-loaded picture are same as the brightness distribution characteristics of the picture to be displayed.

11. The method of driving the display device according to claim 10, wherein the step of adjusting the first gamma voltage corresponding to the picture to be displayed to the second gamma voltage comprises:

acquiring an analog power supply voltage of the display device, wherein the analog power supply voltage is used to generate the first gamma voltage;

reducing a voltage value of the analog power supply voltage to adjust the first gamma voltage to the second gamma voltage.

12. The method of driving the display device according to claim 11, wherein the step of reducing the voltage value of the analog power supply voltage to adjust the first gamma voltage to the second gamma voltage comprises:

reducing the analog power supply voltage to a first voltage;

acquiring a power consumption of the display device, and outputting the second gamma voltage based on the first voltage if the power consumption of the display device is less than a preset power consumption; and continuing to reduce the analog power supply voltage until the power consumption of the display device is less than the preset power consumption if the power consumption of the display device is greater than the preset power consumption.

13. The method of driving the display device according to claim 10, wherein the step of adjusting the first gamma voltage to the second gamma voltage comprises:

reducing the first gamma voltage corresponding to each of the gray scale to obtain the second gamma voltage corresponding to each of the gray scale according to a difference between a power consumption of the heavy-loaded picture and the preset power consumption.

14. The method of driving the display device according to claim 10, wherein the method of driving the display device further comprises:

acquiring a driving voltage of a source driving chip, wherein the source driving chip is configured to output the first gamma voltage or the second gamma voltage; and reducing a voltage value of the driving voltage if the picture to be displayed is the heavy-loaded picture.

15. The method of driving the display device according to claim 10, wherein the method of driving the display device further comprises:

increasing a brightness of a backlight of the display device if the picture to be displayed is the heavy-loaded picture.

16. The method of driving the display device according to claim 10, wherein the step of acquiring the brightness distribution characteristics of the heavy-loaded picture comprises:

acquiring a type of pixel-driving architecture of the display device; and determining brightness distribution characteristics of the picture to be displayed according to the type of the pixel-driving architecture.

17. A display device comprising:

an acquiring module configured to obtain a picture to be displayed;

an detection module configured to determine whether the picture to be displayed is a heavy-loaded picture;

an adjustment module configured to adjust a first gamma voltage corresponding to the picture to be displayed to a second gamma voltage if the picture to be displayed is the heavy-loaded picture, wherein corresponding to a same gray scale, a voltage value of the second gamma voltage is less than a voltage value of the first gamma voltage; and a driving module configured to drive the display device to display the picture to be displayed according to the second gamma voltage, wherein the acquiring module is further configured to acquire brightness distribution characteristics of the heavy-loaded picture and brightness distribution characteristics of the picture to be displayed, and wherein the detection module is further configured to compare the brightness distribution characteristics of the heavy-loaded picture with the brightness distribution characteristics of the picture to be displayed, and determine the picture to be displayed is the heavy-loaded picture if the brightness distribution characteristics of the heavy-loaded picture are same as the brightness distribution characteristics of the picture to be displayed.

18. The display device according to claim 17, wherein the adjustment module is further configured to adjust the second gamma voltage according to a target gamma voltage curve.

19. The display device according to claim 17, wherein the adjustment module is further configured to increase a brightness of a backlight of the display device when the picture to be displayed is the heavy-loaded picture.

* * * * *